Figure 1:
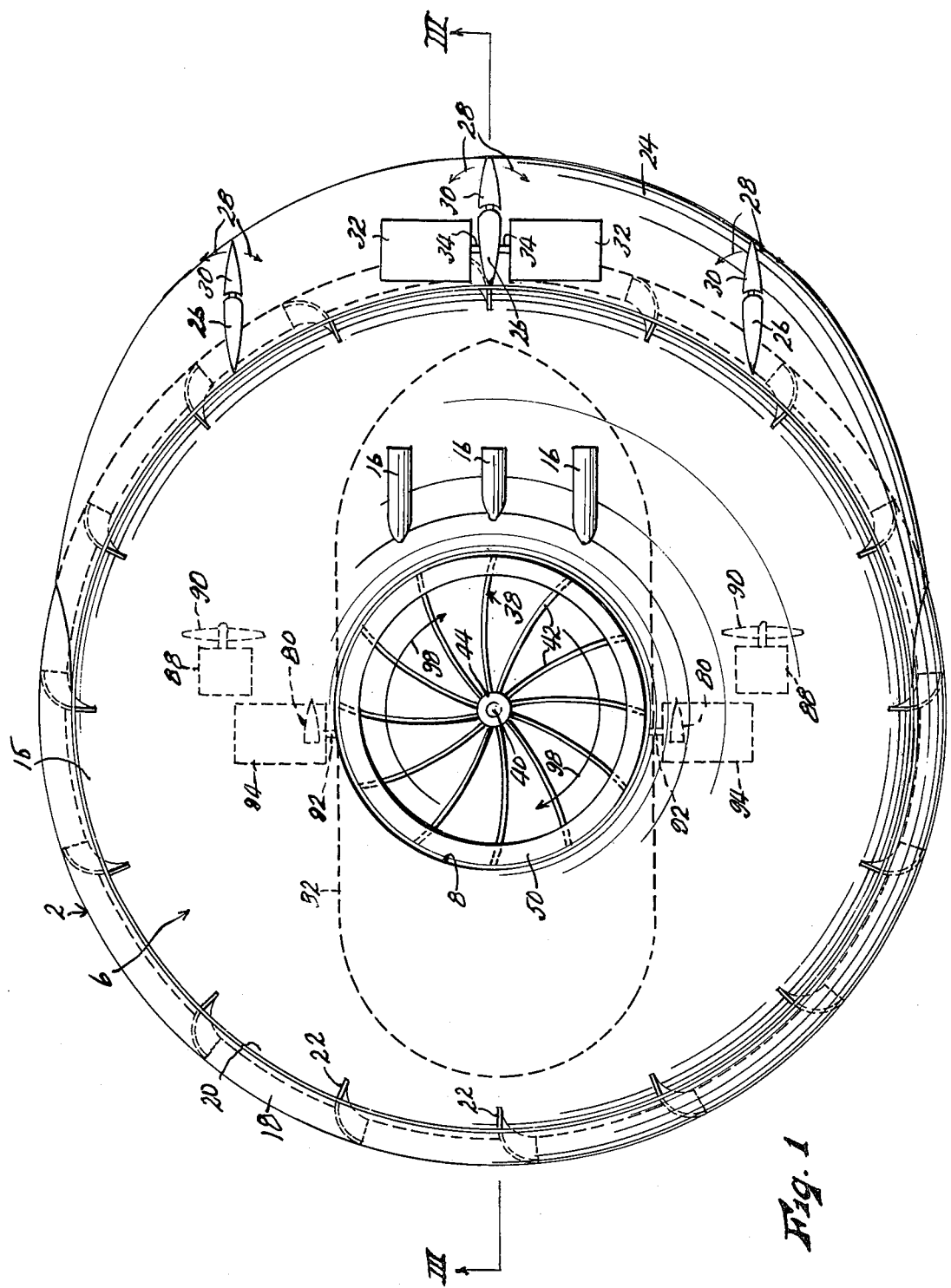

United States Patent [19]
Surbaugh

[11] 3,915,411
[45] Oct. 28, 1975

[54] DISCOIDAL AIRCRAFT
[75] Inventor: Richard M. Surbaugh, Lake Ozark, Mo.
[73] Assignee: Paul R. Distler, Lake Ozark, Mo. ; a part interest
[22] Filed: July 24, 1974
[21] Appl. No.: 491,280

[52] U.S. Cl............................................. 244/12 C
[51] Int. Cl.². ........................................ B64C 29/00
[58] Field of Search ......... 244/12 C, 12 B, 23 C, 87

[56] References Cited
UNITED STATES PATENTS

| | | | |
|---|---|---|---|
| 2,120,065 | 6/1938 | DeRouge | 244/87 |
| 2,927,746 | 3/1960 | Mellen | 244/12 C |
| 2,944,762 | 7/1960 | Lane | 244/12 C |
| 2,978,206 | 4/1961 | Johnson | 244/23 C |
| 3,067,967 | 12/1962 | Barr | 244/12 C |
| 3,073,551 | 1/1963 | Bowersox | 244/23 C |
| 3,276,723 | 10/1966 | Miller et al. | 244/12 C |
| 3,572,613 | 3/1971 | Porter | 244/12 C |

Primary Examiner—Trygve M. Blix
Assistant Examiner—Barry L. Kelmachter
Attorney, Agent, or Firm—John A. Hamilton

[57] ABSTRACT

An aircraft consisting of a large horizontally discoidal airfoil from which the passenger and freight cabin depends, the airfoil being specially designed to function selectively either as a "flying wing" under the impetus of rearwardly directed air impelling propellors, for horizontal flight, or as a discoidal type airfoil for vertical take-off and landing under the impetus of a top central air impellor operable to direct air radially and horizontally outwardly in all directions.

3 Claims, 3 Drawing Figures

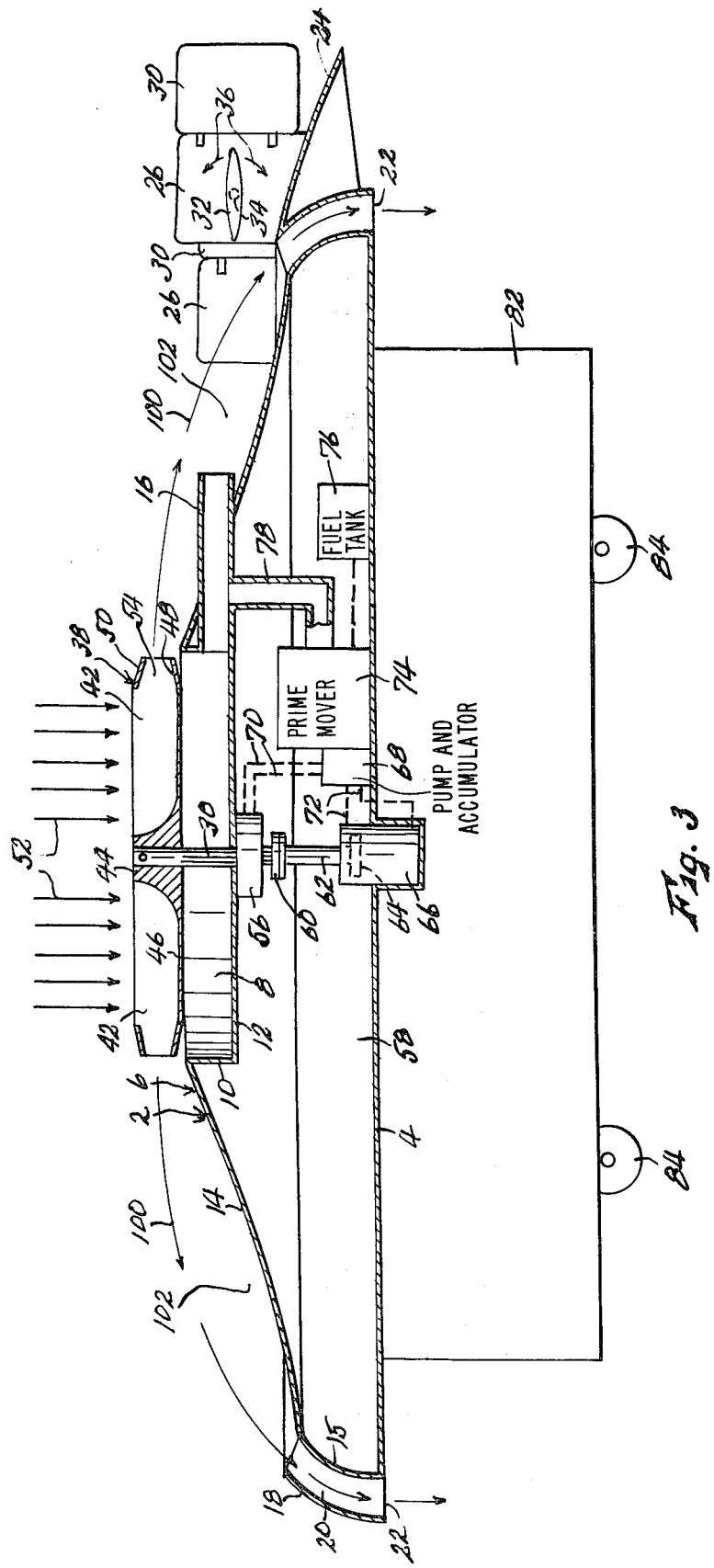

DISCOIDAL AIRCRAFT

This invention relates to new and useful improvements in aircraft, and has particular reference to vertical take-off and landing aircraft, commonly known as VTOL craft.

VTOL aircraft of a certain type, commonly known as "discoidal," and consisting of a large, horizontally circular airfoil with an air impellor disposed centrally thereabove and operable to direct air radially and horizontally outwardly in all directions above the top surface of the airfoil to create a vertical lift, have been previously proposed. However, while such an arrangement does provide vertical take-off and landing, it is rather ineffective and inefficient in providing good horizontal flight characteristics once the craft is in the air. The circular airfoil and top air impellor are of course not designed primarily for horizontal flight, but for maximum lifting power, with horizontal travel being supplied by, in some manner, directionalizing the air flow from the top air impellor to produce a horizontal component greater in one direction than in any other. For example, the air flow from the top air impellor may be restricted to a predominantly rearward direction, to drive the craft forwardly, or the entire craft may be tilted, so that the lift on the craft provided by the flow of air over the airfoil is given a horizontal component in any desired horizontal direction, in the manner of a helicopter. Both of these methods, and all others within my knowledge, impair the lift force provided by the top air impellor to support the craft vertically, so that still greater power is required to support the craft at a given altitude in horizontal flight, and make only inefficient usage of the impellor power in providing horizontal flight. Thus craft of this type have generally slow, poor flight characteristics when moving horizontally. No plane of this general type within my knowledge develops sufficient horizontal speed to support itself in the air in the manner of the usual straight-wing airplane, that is, in which the circular airfoil provides sufficient lift, solely by its forward travel through the air, and without the lift provided by the top impellor, to support the craft in the air.

Accordingly, the primary object of the present invention is the provision of an aircraft generally of the discoidal type as discussed above, but which nevertheless possesses good horizontal flight characteristics. Essentially, this object is accomplished by the provision of a generally discoidal airfoil equipped with a top air impellor as before, but which is specially designed and equipped to function in the manner of a straight wing in horizontal flight at or above a certain horizontal speed, and by the addition of rearwardly directed air impellor means operable to power the craft in horizontal flight at speeds at and above that rate. The top impellor may be retracted within the airfoil so that it does not impair the air-flow pattern of the airfoil in its function as a straight wing. Both the top and rearward impellors may be used conjointly to lift and drive the craft horizontally at horizontal speeds less than that required for the airfoil to function solely in its straight-wing capacity.

Another object is the provision of an aircraft of the character described in which the top surface of the airfoil is specially designed to provide a greater lifting force over a greater proportion of its total area than has heretofore been obtainable.

A further object is the provision of an aircraft of the character described with the addition of an auxiliary airfoil of annular form extending around the periphery of the discoidal airfoil and operable still further to increase the lifting force provided by said airfoil.

A still further object is the provision of an aircraft of the character described having a single set of flight attitude controls, such as rudders and ailerons which function effectively in the air stream created either by the top air impellor, or by forward horizontal movement of the airfoil.

Still another object is the provision of an aircraft of the character described wherein the direction of air intake into the top air impellor, and the direction in which the air is eventually discharged from the airfoil, are downward, whereby to assist in providing lifting force.

Other objects are general simplicity and economy of design, and efficiency and dependability of operation.

Figure 2:
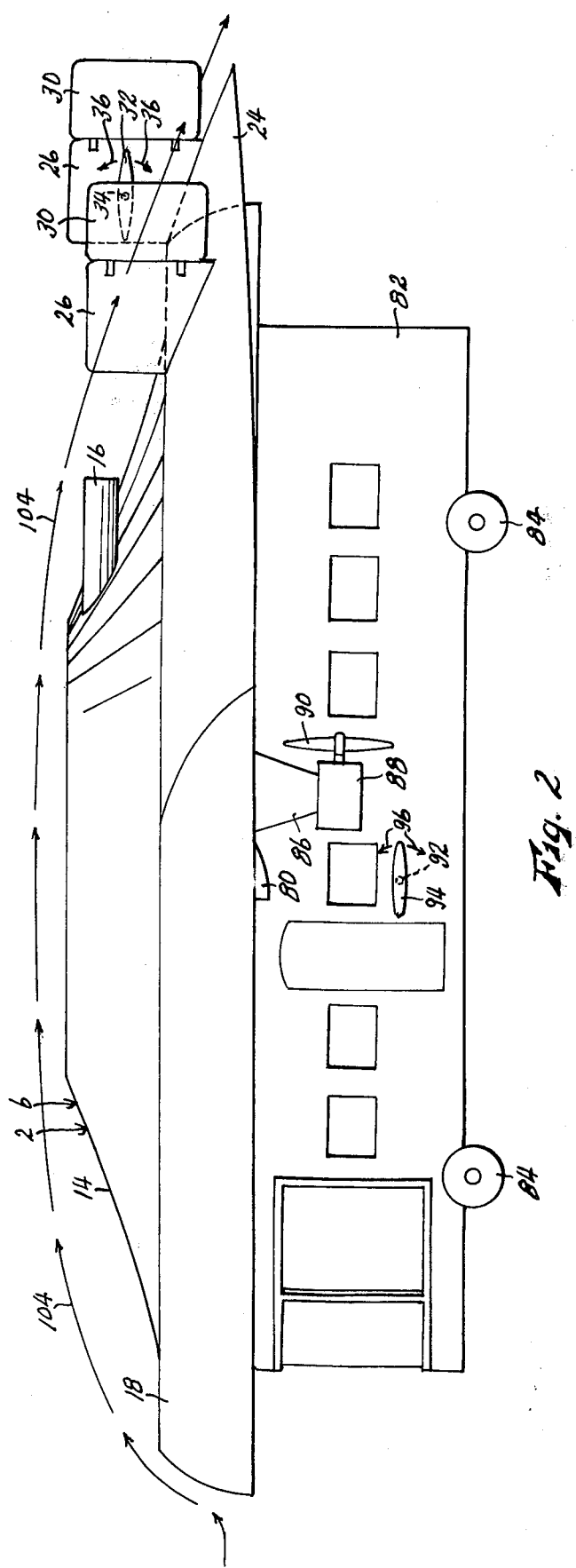

With these objects in view, as well as other objects which will appear in the course of the specification, reference will be had to the accompanying partially schematic drawing, wherein:

FIG. 1 is a top plan view of a discoidal aircraft embodying the present invention, FIG. 2 is a side elevational view of the aircraft, and FIG. 3 is a sectional view taken on line III—III of FIG. 1.

Like reference numerals apply to similar parts throughout the several views, and the numeral 2 applies generally to the main airfoil of the aircraft. Said airfoil is generally circular or discoidal in a horizontal plan. Its lower wall 4 is circular and may be generally planar as indicated. Its upper wall 6 is provided with a depressed central well 8 which is cylindrical about a vertical axis, having a cylindrical peripheral wall 10 and a horizontal floor 12 and opening upwardly. Outwardly from well 8, top wall 6 is formed generally as a concave frustum of a cone 14, sloping downwardly and outwardly in a curve so as to be upwardly concave. The extreme peripheral portion 15 of said top wall is curved oppositely to portion 14, sloping downwardly and outwardly in an upwardly convex curvature to mate at its extreme lower edge with the peripheral edge of bottom wall 4, to which it is affixed. Interconnected into cylindrical wall 10 of well 8 are a number, three as shown, of rearwardly extending horizontal jet pipes 16, which extend rearwardly from said well through the conical wall 14 of the airfoil and are open at their rearward ends.

Also forming a part of the main airfoil thus far described is an auxiliary airfoil 18 which is annular in form and concentric with the main airfoil, but of somewhat larger diameter than the main airfoil. It is formed of sheet metal, and in cross-sectional contour is spaced outwardly and upwardly from portion 15 of the main airfoil, being curved generally equally therewith but spaced outwardly therefrom to form an annular air passage 20 therebetween. Airfoil 18 is permanently affixed to portion 15 of the main airfoil by a series of angularly spaced apart web members 22 extending radially therebetween and affixed thereto.

A generally crescent shaped tail member 24, also formed of sheet metal, is affixed along its inward edge to the upper edge of auxiliary airfoil 18 around the rearward portion thereof. Said tail member curves outwardly and downwardly above airfoil 18, being upwardly convex in the same manner as said airfoil but of lesser slope. It extends well rearwardly from airfoil 18, and at its forward ends merges smoothly into the contour of said airfoil, as shown.

Affixed to and extending upwardly from tail member 24 are a number of vertical flight stabilizers 26, said stabilizers being generally planar with their planes parallel to the line of forward horizontal travel of the craft. Pivoted to the rearward edge of each stabilizer 26, for lateral movement as indicated by arrows 28 in FIG. 1, is a generally planar, vertical rudder 30. Said rudders may be operated by the pilot of the craft by standard means well known in the art, and not shown here. As shown, one vertical stabilizer and corresponding rudder may be disposed at the longitudinal centerline of the craft, with auxiliary stabilizer-rudder units spaced at respectively opposite sides thereof. Carried by the central stabilizer 26, at respectively opposite sides thereof, are a pair of elevator-ailerons 32. Each of members 32 is mounted on a shaft 34 which projects horizontally and laterally from central stabilizer 26, and is generally planar with its plane disposed normally horizontal, but may be tilted vertically, as indicated by arrows 36 in FIGS. 2 and 3, by turning shafts 34. Preferably for reasons which will presently appear, the two elevator-ailerons are independently operable, also by standard means controlled by the pilot, so that they can be turned either simultaneously in the same direction, or simultaneously in opposite directions. The former is an elevator action, and the latter an aileron action, as will appear.

Mounted within well 8 of the main airfoil is a top air impellor wheel 38. Said impellor wheel is fixed centrally on a vertical shaft 40 disposed concentrically of well 8, and includes curved radial blades 42 extending from a hub 44 fixed on the shaft. The wheel is generally horizontally planar and is provided with a floor 46 beneath blades 42 and secured thereto along their entire lengths, being provided with an upturned angular lip 48 at its peripheral edge. An annular air-directing ring 50 is affixed to the upper edges of blades 42 at their outer ends, and in cross-sectional contour is inclined downwardly toward the wheel periphery. When the impellor wheel is rotated by turning shaft 40, air is drawn downwardly thereinto, as indicated by arrows 52 in FIG. 3, and directed horizontally and radially outwardly in all directions through the peripheral throat 54 provided by lip 48 and ring 50, so long as said wheel projects above well 8.

Shaft 30 of the impellor wheel projects downwardly through floor 12 of well 8, being rotatably driven by a hydraulic turbine 56 or the like mounted in the chamber 58 between upper and lower walls 6 and 4 of the main airfoil. Said shaft is splined for vertical movement through said turbine, and is connected at its lower end by a thrust bearing 60 to the upper end of a nonrotating piston rod 62 having at its lower end a piston 64 operable in a vertical cylinder 66 mounted in lower airfoil wall 4. Thus piston rod 62 does not rotate, but can function to elevate impellor wheel 38 above well 8, as shown in FIG. 3, or to retract it within said well, as indicated in FIG. 2. Turbine 56 is operated by fluid delivered thereto by a hydraulic pump and accumulator indicated at 68 through an operative connection 70 therebetween, it being understood that said connection includes standard controls, not shown, whereby impellor wheel 38 may be started, stopped or its speed varied. Cylinder 66 and piston 64 is operated by fluid delivered thereto by pump and accumulator 68 through an operative connection 72, which will be understood to include standard controls, not shown, which permit impellor wheel 38 to be extended completely above well 8 as in FIG. 3, retracted completely within said well, or set at any intermediate position. The pump 68 is driven by a suitable prime mover 74 mounted in chamber 58, such as an internal combustion engine powered by fuel from a fuel tank 76. The exhaust 78 of said engine is connected into one of jet pipes 16, while an air supply to the engine is provided by a pair of air scoops 80 opening through the lower wall 4 of the airfoil.

The aircraft cabin 82, for the pilot, passengers and freight, is affixed centrally to the lower wall 4 of the main airfoil, and depends therefrom. It is shown only schematically, particularly in FIG. 3, and is provided at its bottom with ground-engaging wheels 84 for supporting the craft when it is on the ground. Air scoops 80 are disposed at respectively opposite sides of the cabin. Also mounted at respectively opposite sides of the cabin, by means of struts 86 depending from lower airfoil wall 4, are pair of engines 88 of any suitable type, each operable to drive a propellor 90 positioned to drive air horizontally to the rear. The operation and control system for engines 88 may be standard, and are not shown. Also mounted at each side of cabin 82, on a shaft 92 extending horizontally and laterally from said cabin, is an aileron 94 which is generally planar in a normally horizontal plane, but which may be tilted as indicated by arrows 96 in FIG. 2 by turning shafts 92. It will be understood that said ailerons pivot in respectively opposite directions by pilot-controlled means, not shown.

In operation, to accomplish a vertical take-off, air impellor wheel 38 is extended above well 8 as shown in FIG. 2 by operation of hydraulic cylinder 66, and turbine 56 set in operation as driven by engine 74 to rotate said wheel, as indicated by arrows 92 in FIG. 1. Air is thus drawn downwardly into the impellor wheel, as indicated by arrows 52 in FIG. 3, and expelled radially outwardly through throat 54 of said wheel at a high speed, as indicated by arrows 100. As said air moves outwardly over concave conical portion 14 of the airfoil, it creates a zone 102 of reduced air pressure, or a partial vacuum, between surface 14 and the normal horizontal plane of the ejected air, which both pulls the air downwardly in a generally curving path as shown, and also exerts a corresponding lifting force on the aircraft. The concave curvature of surface 14, rather than the convex curvature more common in craft of this general type, provides a more rapid separation between itself and the main air flow, and hence is conducive to the more efficient production of a higher degree of vacuum, and hence provides a greater lifting force per unit of area of surface 14. This is particularly true in the portion of area 14 close to impellor wheel 38, since if as is more common this surface were convex and substantially horizontal immediately adjacent the impellor, the air would follow it outwardly for a substantial radial distance before being caused by centrifugal force to leave said surface to create a vacuum therebetween. At the outer edge of airfoil surface 14, at least a portion of the air will enter into the air passage 20 between auxiliary annular airfoil 18 and portion 15 of the main airfoil, and be expelled downwardly therefrom as indicated. The air-flow through this passage creates a reduced air pressure at the outer surface of portion 15, an increased pressure at the inner surface of airfoil 18, and a reduced pressure at the outer surface of airfoil 18. All of these pressure differentials create further lifting force on the aircraft, so that airfoil 18 serves a a valuable adjunct to the main airfoil 2. Also, the downward ejection of air from passage 20, and the downward suction of air into the impellor wheel, both result in upward forces on the craft. Thus the lifting force, reflected by correspondingly greater upward air pressure against bottom wall 4 of the main airfoil, increases with the speed and air delivery rate of impellor wheel 38, and when this lifting force equals and exceeds the weight of the craft, said craft will rise vertically from the ground.

During vertical movement of the craft, its attitude in the air is controlled by elevator-ailerons 32 as acted on by air directed rearwardly by the impellor wheel, not all of which of course enters passageway 20 of the auxiliary airfoil. That is, members 32 may be caused to pivot simultaneously in the same direction to act as elevators to control the front-to-rear "yawing" of the craft, and may be caused to pivot simultaneously in opposite directions to act as ailerons to produce and control lateral rolling of the craft. Ailerons 94 are substantially inoperative at this time, since they may have little or no horizontal air currents acting thereagainst, and since propellar engines 88 are either not operating or operating only slowly at this time. The heading of the plane is controlled by rudders 30. Also, during operation of the top impellor, there are reactive forces tending to rotate the craft in a direction opposite to the rotation of the impellor. This may be controlled by rudders 30, or, to provide a built-in correction, the webs 22 between the main and auxiliary airfoils may be curved horizontally, as indicated in FIG. 1, whereby the flow of air through passage 20 acts on said webs to exert a horizontally rotative force on the craft. As shown, some of said webs may be curved in one direction and some in the other, the proportion curved in each direction being selected to provide a generally equal balance of rotative and counter-rotative forces on the craft.

When the craft has risen vertically to the required or desired altitude, propellor engines 88 are started, or speeded, to cause propellors 90 to drive the plane horizontally forwardly through the air. This forward motion of the craft creates an air flow over the top of the craft as indicated by arrows 104 in FIG. 2, the forward portion of auxiliary airfoil 18 deflecting air upwardly and rearwardly over the top of the main airfoil, creating a zone of reduced air pressure above the airfoil, and a correspondingly higher pressure below the airfoil. The airfoil is then functioning in the manner of a straight wing, and will provide sufficient lift force to support the craft when a sufficiently high forward speed has been reached. Before this speed has been reached, and the straight-wing effect is therefore still not providing adequate lift force, impellor wheel 38 must be continued in operation to provide a supplemental lift force. At the same time, the upward projection of the impellor wheel above the airfoil, as shown in FIG. 3 and as required for vertical take-offs and landings, would cause said wheel to obstruct and interfere with the air flow pattern shown in FIG. 2. Therefore, as the forward horizontal speed of the craft is gradually increased, and the requirement for the lifting effect of the impellor is correspondingly gradually decreased, said impellor is gradually retracted into well 8 of the airfoil until, when the craft is moving at a sufficiently high horizontal speed to be supported solely by the straight-wing action of the airfoil, said impellor may be retracted completely into the well and its operation terminated. At positions of partial retraction, air expelled into the well by the impellor is vented through jet pipes 16, so as to provide an additional forward thrust, During horizontal flight, cabin ailerons 94 are fully operative, and tail elevator-ailerons 32 may be used solely as elevators. The rearward extension of rudders 30, stabilizers 26 and elevator-ailerons 32 provided by tail section 24 is useful in providing good stability in horizontal flight.

Vertical landings are accomplished by essentially reversing the described process, that is, by gradually reducing forward speed while driving and gradually extending impellor 38 from well 8 until the craft is hovering in a substantially stationary position, then reducing the impellor speed to allow the craft to settle gradually to the ground.

While I have shown and described a specific embodiment of my invention, it will be readily apparent that many minor changes of structure and operation could be made without departing from the spirit of the invention.

What I claim as new and desire to protect by Letters Patent is:

1. An aircraft comprising:
   a. a horizontally discoidal airfoil having a top surface and a bottom surface, and being provided with a central, upwardly opening well formed in the top surface thereof,
   b. a first air impellor disposed centrally of said airfoil, being carried thereby, and operable when driven to direct air horizontally and radially outwardly in all directions, said well being capable of receiving said first air impellor downwardly therein,
   c. adjusting means carried by said airfoil and operable to move said first air impellor selectively to positions either completely above said well, or completely retracted within said well, or to any intermediate position, said first impellor being operable when extended above said well to direct air horizontally and radially outwardly over the top surface of said airfoil, the top surface of said airfoil sloping downwardly and outwardly from the periphery of said well to the outer edg of said airfoil,
   d. means carried by said craft and operable to drive said first impellor,
   e. a cabin affixed to and depending from the bottom of said airfoil,
   f. control members carried by said airfoil and disposed in the path of air currents expelled from said first impellor, said control members being movable relative to said air currents to control the flight attitude of said craft, and
   g. a second air impellor carried by said airfoil and operable to direct air horizontally in one direction only, whereby to propel said craft horizontally forwardly through the air, said first and second air impellors being independently controlled.

2. An aircraft as recited in claim 1 with the addition of rearwardly directed jet pipes interconnected into said well and opening rearwardly to the atmosphere, whereby air expelled into said well by said first impellor, when said impellor is retracted within said well, is vented through said jet pipes to provide a forward thrust force on said craft.

3. An aircraft as recited in claim 1 wherein said control members include:
   a. a tail member affixed to and extending rearwardly from said airfoil,
   b. at least one generally planar vertical stabilizer affixed to and rising from said tail member in the path of air expelled by said first impellor when said first impellor is extended above said well, with its plane extending forwardly and rearwardly relative to said craft,
   c. a generally planar, vertical rudder pivoted to the rearward edge of said vertical stabilizer and operable to be pivoted horizontally and laterally, and
   d. a pair of normally horizontal generally planar elevator-ailerons carried for pivotal movement by said vertical stabilizer about a horizontal transverse axis, and being disposed at respectively opposite sides of the midline of the craft, said elevator-ailerons being independently operable for pivotal movement selectively in the same direction and in opposite directions.

* * * * *